Patented Feb. 17, 1925.

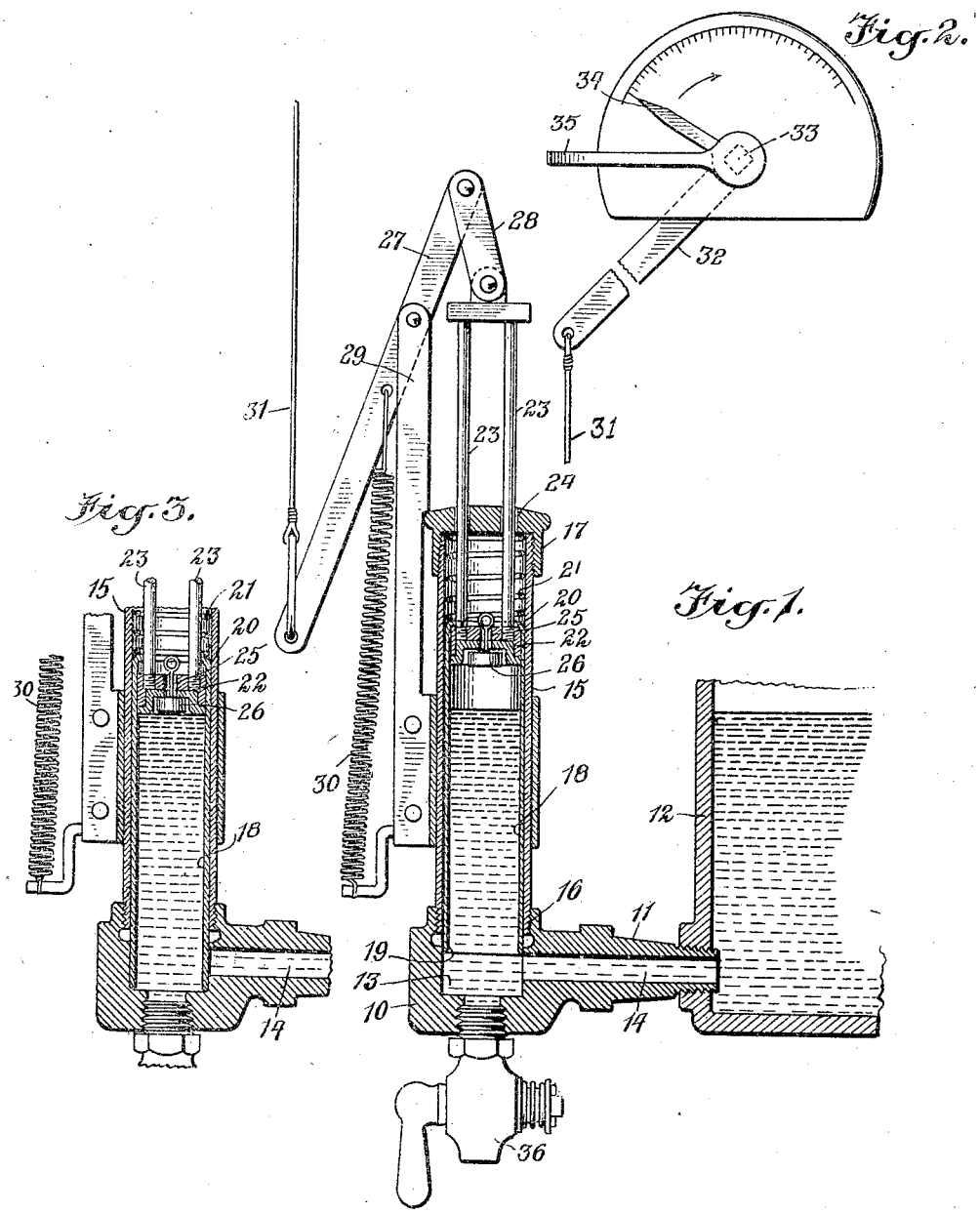

1,526,376

UNITED STATES PATENT OFFICE.

ALFRED L. ROSENMUND, OF PATERSON, NEW JERSEY, ASSIGNOR TO MASTER MANUFACTURING COMPANY, OF PATERSON, NEW JERSEY, A CORPORATION OF NEW JERSEY.

LIQUID-LEVEL INDICATOR AND METHOD.

Application filed August 30, 1921. Serial No. 496,857.

*To all whom it may concern:*

Be it known that I, ALFRED L. ROSENMUND, a citizen of Switzerland, and a resident of Paterson, in the county of Passaic and State of New Jersey, have made and invented certain new and useful Improvements in Liquid-Level Indicators and Methods, of which the following is a specification.

My invention relates to a device for indicating the level of a liquid and more particularly to an apparatus which may be secured to the crank case of an automobile engine and which upon the actuation of a suitable handle will indicate the height or level of oil in the crank case.

It is extremely important in the operation of the ordinary automobile engine that the oil in the crank case be maintained at a certain level, so that the bearings and entire engine will be properly lubricated. It has heretofore been proposed to provide means for ascertaining the level of the oil in the crank case by means of a gauge glass, float, and other devices, but, due to the severe conditions under which these devices must operate, caused by the jouncing and jolting of the car and the vibration of the engine, it has been found that they are not reliable in their indications, and being unreliable have not been adopted to any considerable extent.

It is accordingly an object of my invention to provide a device or apparatus for indicating the level of the oil in the crank case which will be positive in its action and will operate under the most severe conditions and will at no time give a false indication or reading.

A further object is to accomplish the afore-mentioned ends in a simple and expeditious manner, the device embodying but few parts and so designed and arranged as to be economically manufactured and at the same time, as previously mentioned, strong and rugged in structure so as to stand up under the severe service to which it will be necessarily exposed.

With the foregoing and other objects in view, my invention consists in the improved oil level indicator illustrated in the accompanying drawings and hereinafter described and claimed and in such variations and modifications thereof as will be obvious to those skilled in the art to which my invention relates, it being understood that changes may be made within the scope of what is claimed without departing from the spirit of the invention.

In the accompanying drawings:

Figure 1 is a view in vertical section of my improved oil level indicator;

Figure 2 is a detail view of the dial and associated parts wherein the reading as to the level of the oil is taken;

Figure 3 is a fragmental view in section showing the position of the valves and plunger at the time the level or height of the oil is being indicated.

Referring specifically to the several views, wherein similar reference numerals designate corresponding parts throughout, my improved oil indicating device is formed with a base 10, projecting from which is a nozzle 11 which threads into and communicates with the crank case 12. The base 10 is provided with the chamber 13 which communicates with the port 14 leading through the nozzle 11 and by means of which the chamber 13 is in communication with the interior of the crank case 12.

Extending upwardly from the base is the barrel 15, the same being preferably threaded into the base at its lower extremity 16 and carrying the threaded cap 17 at its upper extremity. Slidably mounted within the barrel 15 is the sleeve 18, the bottom extremity 19 of which is adapted to pass down into the chamber 13 of the base and cover the oil port 14 so as to close the same. The upper extremity of the sleeve valve is inwardly turned as at 20 and against which impinges the lower extremity of the compression spring 21, the remote extremity of the spring impinging against the cap 17, so that the tendency of the spring is to move the sleeve valve into its lowered position and close the port 14, which tendency, however, is normally overcome by a second and stronger spring, as will be hereinafter explained.

A plunger or piston 22 is located in the sleeve 18 and is actuated by the piston rods 23, preferably two in number, which extend through suitable openings 24 in the cap 17. In this connection, however, it is to be noted that a single piston rod may be used should it be so desired. The plunger 22 is provided with an air vent 25 extending therethrough, normally maintained in an open position so as to provide for the escapement of air thru the plunger, but adapted to be closed and prevent the passage of oil therethrough by a float valve member 26. The float valve member 26 is so designed that when the plunger reaches the surface of the oil it will be carried upwardly and close the air vent 25.

A lever or walking beam 27 is connected to the piston rods by the link 28 and is mounted for pivotal movement upon the frame member 29. A tension spring 30 is secured to the lever 27 and to a portion of the frame 29 and is adapted to hold the outer extremity of the lever in a depressed position and the piston rods and plunger in an elevated position adjacent the top of the barrel 15. A flexible member or link 31 is connected to the outer and free extremity of the lever 27 and is also connected to the dial indicator illustrated in Figure 2. The lever 32 to which the flexible member 31 is connected is carried by a shaft 33 to which a pointer 34 is secured and to which a handle 35 is also attached.

*Operation.*—With the parts as thus constructed and arranged, the tension spring 30 will maintain the plunger 22 in an elevated position and the plunger while being so elevated contacts against the inturned upper extremity 20 of the sleeve valve 18 and accordingly elevates the same, overcoming the action of the compression spring 21 and uncovering the oil inlet port 14, so that oil may flow from the crank case 12 into the chamber 13 of the base and into the barrel 15 and sleeve 18 of the device and in accordance with the well known laws of liquids will seek a level or height therein corresponding to the height or level of the oil in the crank case. When the operator desires to ascertain the height or level of oil in the crank case, the handle 35 is manually rotated in the direction of the arrow, causing the raising of the lever 32 and through the intervention of the flexible member 31, a corresponding raising of the lever 27. As the outer and free extremity of the lever 27 is raised, a corresponding depression or lowering of the plunger is effected. The initial lowering of the plunger 22 allows the spring 21 to function and to lower the sleeve valve 18 and thus close the oil inlet and outlet port 14, so that the oil within the barrel is accordingly trapped therein and prevented from escapement during the indicating of the height of the same. As the plunger is moved downwardly the air above the top of the oil and below the plunger readily escapes through the air vent 25, which vent remains open until the float valve 26 reaches the top surface of the oil within the barrel, whereupon it moves upwardly and closes, thus preventing the oil from escaping through the air vent. The plunger will accordingly be arrested from further descent by the oil. It will thus be apparent that the handle and the pointer 34 may be moved or turned in accordance with the height of the oil within the device, and which amount will be an indication or direct reading of the height of the oil within the crank case.

After the height of the oil as been thus positively indicated, the handle 35 is released and will be returned to its original position thru the action of the spring 30, which will depress the outer and free extremity of the lever 27 and raise the plunger 22. As the plunger 22 is raised above the surface of the oil, the float valve 26 will open, allowing for the ingress of air and preventing a vacuum being formed below the plunger. As the plunger approaches its uppermost position it contacts with the inturned end of the valve sleeve 18 and elevates the same against the action of the spring 21 and accordingly again opens the oil inlet 14, so that the level of the oil within the device may vary and follow the fluctuation of the oil level within the crank case.

From the foregoing it will be apparent that I have provided an apparatus for indicating the level of oil within the crank case or in fact may be used for the indication of the level of a liquid in a tank or other receptacle, and, further, that the apparatus is positive in its action, and, due to the incompressibility of a liquid will always give a true indication of the height or level of the same. In order that the indicator may be cleaned or drained a suitable valve 36 is provided and communicates with the lower extremity of the chamber 13.

Having thus described and explained my invention, I claim and desire to secure by Letters Patent:

1. A liquid level indicator comprising a chamber adapted to communicate with a receptacle containing a liquid the level of which is to be indicated, a plunger fitting within said chamber, a valve normally maintained in an open position and adapted to be closed upon the lowering of said plunger to prevent the escape of the liquid from said receptacle, there being an air vent communicating with the spaces above and below the plunger, means for closing said air vent against the passage of a liquid therethrough, thereby causing the upper surface of the liquid within the chamber to arrest the descent of the plunger and means for visually indicating the liquid level.

2. A liquid level indicator for a liquid containing receptacle comprising an upright cylinder, a base member for the cylinder, having a passage and inlet port for establishing communication between the cylinder and the liquid receptacle, a sleeve slidably mounted within said cylinder, a plunger slidably mounted within said sleeve, said sleeve being adapted to close the inlet port when in a lowered position, means for normally maintaining said plunger in an elevated position, and means whereby the plunger when elevated elevates the said sleeve and uncovers said inlet port, means whereby on the lowering of the plunger the said sleeve is lowered to close the inlet port of said cylinder, there being a vent extending through said plunger, a float valve associated therewith, allowing the passage of air and preventing the passage of a liquid through said vent, and means adapted to be actuated for forcibly lowering said plunger to contact with the upper surface of said liquid.

3. A liquid level indicator for a liquid containing receptacle comprising an upright cylinder, a base member supporting the same, having a passage and inlet port for establishing communication between the cylinder and the liquid receptacle, a sleeve slidably mounted within said cylinder, a plunger slidably mounted within said sleeve, said sleeve being adapted to cover the inlet port of the said cylinder when in a lowered position, means for normally maintaining said plunger in an elevated position, means whereby the plunger when elevated elevates the said sleeve and uncovers said inlet port, means whereby on the lowering of the plunger the said sleeve is lowered to close the inlet port of said cylinder, there being a vent extending through said plunger, a float valve associated therewith, allowing the passage of air and preventing the passage of a liquid through said vent, means adapted to be actuated for forcibly lowering said plunger to contact with the upper surface of said liquid, and means for indicating at a distance the extent of depression of the plunger and accordingly the height or level of the liquid within the cylinder.

4. An oil level indicator comprising a base having a chamber therein and a port adapted to communicate with a receptacle containing a liquid the level of which is to be indicated, an upright cylinder carried by said base and communicating with the chamber thereof, a sleeve slidably mounted in said cylinder and acting as a valve for said port, a plunger slidably mounted within said sleeve, a piston rod carried by said plunger, a cap closing the upper extremity of said cylinder and slidably receiving the said piston rod therethrough, resilient means adapted to normally maintain said plunger in an elevated position, co-acting means between said plunger and sleeve whereby said sleeve is normally maintained in an elevated position and the port open when said plunger is in an elevated position, resilient means engaging said sleeve and adapted to lower said sleeve and close the port upon the depression of said plunger, there being a vent extending through said plunger, a float valve associated with said vent, allowing the passage of air and preventing the passage of a liquid through said vent, to thereby allow the plunger to be depressed until contacting with and arrested by the top surface of the trapped liquid within the cylinder.

5. An oil level indicator comprising a base having a chamber therein and a port adapted to communicate with a receptacle containing a liquid the level of which is to be indicated, an upright cylinder carried by said base and communicating with the chamber thereof, a sleeve slidably mounted in said cylinder and acting as a valve for said port, a plunger slidably mounted within said sleeve, a piston rod carried by said plunger, a cap closing the upper extremity of said cylinder and slidably receiving the said piston rod therethrough, resilient means adapted to normally maintain said plunger in an elevated position, co-acting means between said plunger and sleeve whereby said sleeve is normally maintained in an elevated position, and the port open when said plunger is in an elevated position, resilient means engaging said sleeve and adapted to lower said sleeve and close the port upon the depression of said plunger, there being a vent extending through said plunger, a float valve associated with said vent, allowing the passage of air and preventing the passage of a liquid through said vent, to thereby allow the plunger to be depressed until contacting with and arrested by the top surface of the trapped liquid within the cylinder, and remote means connected with and adapted to depress said plunger and to indicate the amount of depression of said plunger.

6. An oil level indicator comprising a base having a chamber therein and a port adapted to communicate with a receptacle containing a liquid the level of which is to be indicated, an upright cylinder carried by said base and communicating with the chamber thereof, a sleeve slidably mounted in said cylinder and acting as a valve for said port, a plunger slidably mounted within said sleeve, a piston rod carried by said plunger, a cap closing the upper extremity of said cylinder and slidably receiving the said piston rod therethrough, resilient means adapted to normally maintain said plunger in an elevated position, co-acting means between said plunger and sleeve whereby said sleeve is normally maintained in an elevated position and the port open when said plunger is in an elevated position, resilient means engaging said sleeve and adapted to lower said sleeve and close the port upon the depression of said plunger, there being a vent extending through said plunger, a float valve associated with said vent, allowing the passage of air and preventing the passage of a liquid through said vent, to thereby allow the plunger to be depressed until contacting with and arrested by the top surface of the trapped liquid within the cylinder, and a dial having a calibrated scale thereon, a pointer associated with said dial, a handle associated with said pointer, and means associated with said handle and connected to said piston adapted to forcibly depress the plunger upon the actuation of the handle, and with the pointer adapted to indicate on the dial the point at which the plunger is arrested and accordingly denote the height or level of the liquid within the cylinder and the height or level of the liquid within the receptacle with which the cylinder communicates.

7. A mechanism for measuring liquids including in combination a chamber communicating with the body of liquid to be measured in which the liquid assumes the same level as in the body of liquid, movable devices for cutting off communication between the chamber and the body of liquid, while preserving the height of liquid in the chamber intact and for contracting the volume of the chamber to that of the entrapped liquid, and means for permitting the escape of air or gas from the chamber during said contraction.

8. A mechanism for measuring liquids including in combination a chamber communicating with the body of liquid to be measured in which the liquid assumes the same level as in the body of liquid, devices for cutting off communication between the chamber and the body of liquid, while preserving the height of liquid in the chamber intact and for contracting the volume of the chamber to that of the entrapped liquid, means for permitting the escape of air or gas from the chamber during said contraction, and means for indicating the resultant volume of the chamber and thereby of the entrapped liquid.

9. A mechanism for measuring liquids including in combination a chamber communicating with the body of liquid to be measured in which the liquid assumes the same level as in the body of liquid, devices for cutting off communication between the chamber and the body of liquid, while preserving the height of liquid in the chamber intact and for contracting the volume of the chamber to that of the entrapped liquid, means for permitting the escape of air or gas from the chamber during said contraction but without allowing the escape of the liquid.

10. A mechanism for measuring liquids including in combination a chamber communicating with the body of liquid to be measured in which the liquid assumes the same level as in the body of liquid, devices for cutting off communication between the chamber and the body of liquid, while preserving the height of liquid in the chamber intact, vertically movable means for contracting the volume of the chamber to that of the entrapped liquid, means for permitting the escape of air or gas from the chamber during said contraction, and means for indicating the quantity of liquid within the chamber.

11. A mechanism for measuring liquids including in combination a vertically extending chamber communicating with the body of liquid to be measured in which the liquid assumes the same level as in the body of liquid, devices for cutting off communication between the chamber and the body of liquid, while preserving the height of liquid in the chamber intact, vertically movable means for contracting the volume of the chamber to that of the entrapped liquid, means for visually indicating the movement of said vertically movable means and means for permitting the escape of air or gas from the chamber during said contraction and positively preventing the escape of liquid from the chamber.

12. A mechanism for measuring liquids including in combination a chamber communicating with the body of liquid to be measured, in which the liquid assumes the same level as in the body of liquid, devices for cutting off communication between the chamber and the body of liquid, while preserving the height of liquid in the chamber intact, means for contracting the volume of the chamber to that of the entrapped liquid, said means including a piston with a valve therein, for permitting the escape of air or gas from the chamber during said contraction.

13. A mechanism for measuring liquid including in combination a chamber communicating with the body of liquid to be measured in which the liquid assumes the same level as in the body of liquid, devices for cutting off communication between the chamber and the body of liquid, while preserving the height of liquid in the chamber intact and contracting the volume of the chamber to that of the entrapped liquid, said devices including a piston with a liquid actuated valve therein, said valve permitting the escape of air or gas from the chamber during said contraction.

14. A mechanism for measuring liquids including in combination a chamber communicating with the body of liquid to be measured in which the liquid assumes the same level as in the body of liquid, devices for cutting off communication between the chamber and the body of liquid while preserving the height of liquid in the chamber intact and contracting the volume of the chamber to that of the entrapped liquid without changing the relative dimensions of the entrapped liquid. said devices including a piston with a liquid actuated valve therein for permitting the escape of air or gas from the chamber during said contraction.

15. The method of determining the quantity of liquid in a body which comprises the steps of entrapping a part of the liquid, of equal height with that in the body, in a chamber, and contracting the size of the chamber to that of the liquid, to determine the height of liquid in the body.

16. The method of determining the quantity of liquid in a body which comprises the steps of entrapping a part of the liquid, of equal height with that in the body, in a chamber, and contracting the size of the chamber to that of the entrapped liquid without changing the relative dimensions of the body of entrapped liquid, to determine the height of liquid in the body.

17. The method of determining the quantity of liquid in a body which comprises the steps of entrapping a part of the liquid, of equal height with that in the body, in a chamber, and contracting the size of the chamber to that of the entrapped liquid, and simultaneously permitting the escape of air or gas from the chamber, to determine the height of liquid in the body.

18. The method of determining the quantity of liquid in a body which comprises the steps of entrapping a part of the liquid, of equal height with that in the body, in a chamber, and contracting the size of the chamber to that of the entrapped liquid without changing the height of the body of entrapped liquid, and simultaneously permitting the escape of air or gas from the chamber, to determine the height of liquid in the body.

Signed at Paterson, in the county of Passaic and State of New Jersey, this 25th day of August, A. D. 1921.

ALFRED L. ROSENMUND.

Witnesses:
BENJAMIN K. VAN NORWICK.
LILIAN STRAUMANN.